Aug. 18, 1925.

M. CAPORALE

SECTIONAL WHEEL RIM

Filed March 26, 1924 2 Sheets-Sheet 1

1,550,341

Michael Caporale
INVENTOR

WITNESSES
Louis Goodman
Howard D. Orr

BY
ATTORNEY

Aug. 18, 1925.
M. CAPORALE
1,550,341
SECTIONAL WHEEL RIM
Filed March 26, 1924        2 Sheets-Sheet 2
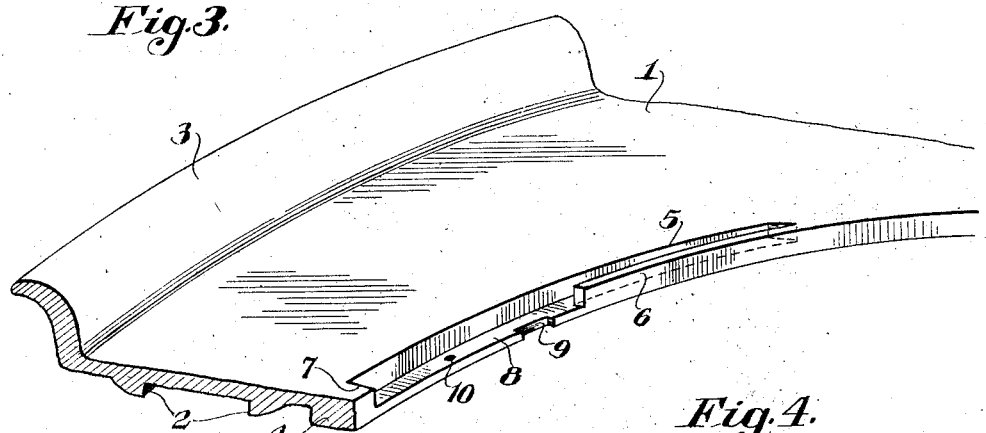
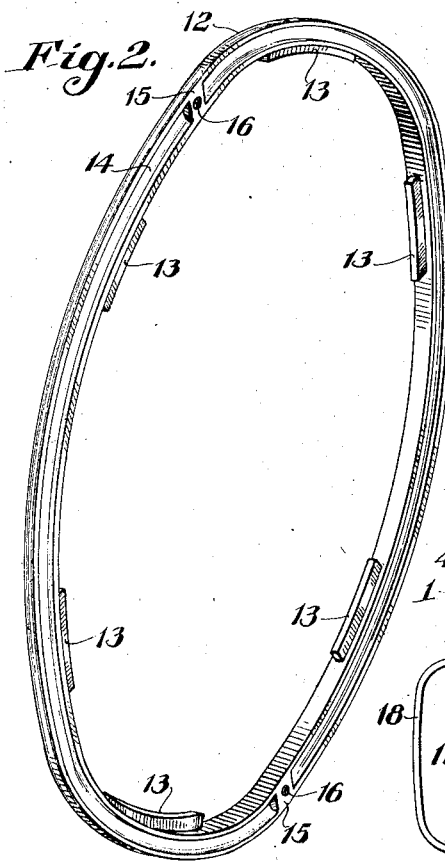
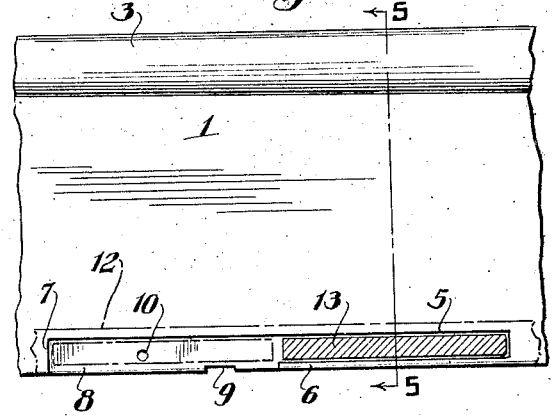
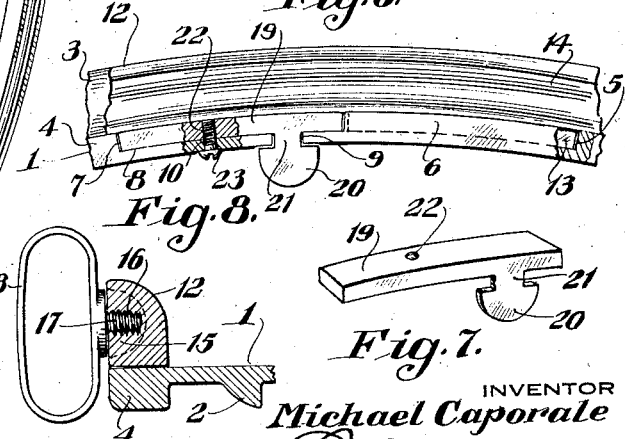
WITNESSES
Louis Goodman
Howard D. Orr
INVENTOR
Michael Caporale
BY
ATTORNEY Patented Aug. 18, 1925.

1,550,341

UNITED STATES PATENT OFFICE.

MICHAEL CAPORALE, OF REVERE, MASSACHUSETTS, ASSIGNOR TO R. C. G. COMPANY, A FIRM COMPOSED OF MICHAEL CAPORALE, SAMUEL RUDOMON, JACOB RUDOMON, AND MAX GERSTEIN, ALL OF BOSTON, MASSACHUSETTS.

SECTIONAL WHEEL RIM.

Application filed March 26, 1924. Serial No. 702,077.

*To all whom it may concern:*

Be it known that I, MICHAEL CAPORALE, a citizen of the United States, residing at Revere, in the county of Suffolk and State of Massachusetts, have invented a new and useful Sectional Wheel Rim, of which the following is a specification.

This invention relates to wheel rims for demountable tires.

The object is to provide a metallic rim which may be mounted on an ordinary felly, said rim having a permanent, integral flange extending around one side edge thereof and adapted to abut one side of a pneumatic tire and having a detachable ring or flange for abutting and holding the other side of the tire, said ring having means interfitting with the rim whereby a motorist may easily and quickly remove a tire from the wheel and replace the same.

Another object is to provide a device of this character located on the outside of the vehicle wheel which, by a simple rotating movement of the locking ring will cause the same to be locked in engagement with the rim at spaced intervals, and by the application of a single locking means for the ring, the latter is prevented from turning and releasing the tire.

A final object is to provide a wheel rim and tire locking means for co-action therewith, which is simple, strong and durable, having no projecting parts extending beyond the face of the rim, and to provide detachable means for connection with the locking ring to facilitate turning thereof to lock the same in position, said detachable means being in the form of handles which are designed to be removed from the ring and carried in the tool kit when not in use.

A full and complete understanding of the invention may be obtained from a consideration of the following detailed description, taken in connection with the accompanying drawings forming a part of this specification; it being understood that while the drawings show a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 2 is a detail perspective view of the locking ring.

Figure 3 is a detail perspective view of a portion of the wheel rim.

Figure 4 is a plan view of a portion of the rim and showing one of the lugs of the locking ring in engagement therewith.

Figure 6 is a side elevation of the subject matter of Figure 4.

Figure 7 is a detail perspective view of the filling and locking block used in connection with the locking ring.

Figure 8 is a detail sectional view, taken on the line 8—8 of Figure 1 and drawn on a larger scale.

Figure 1:
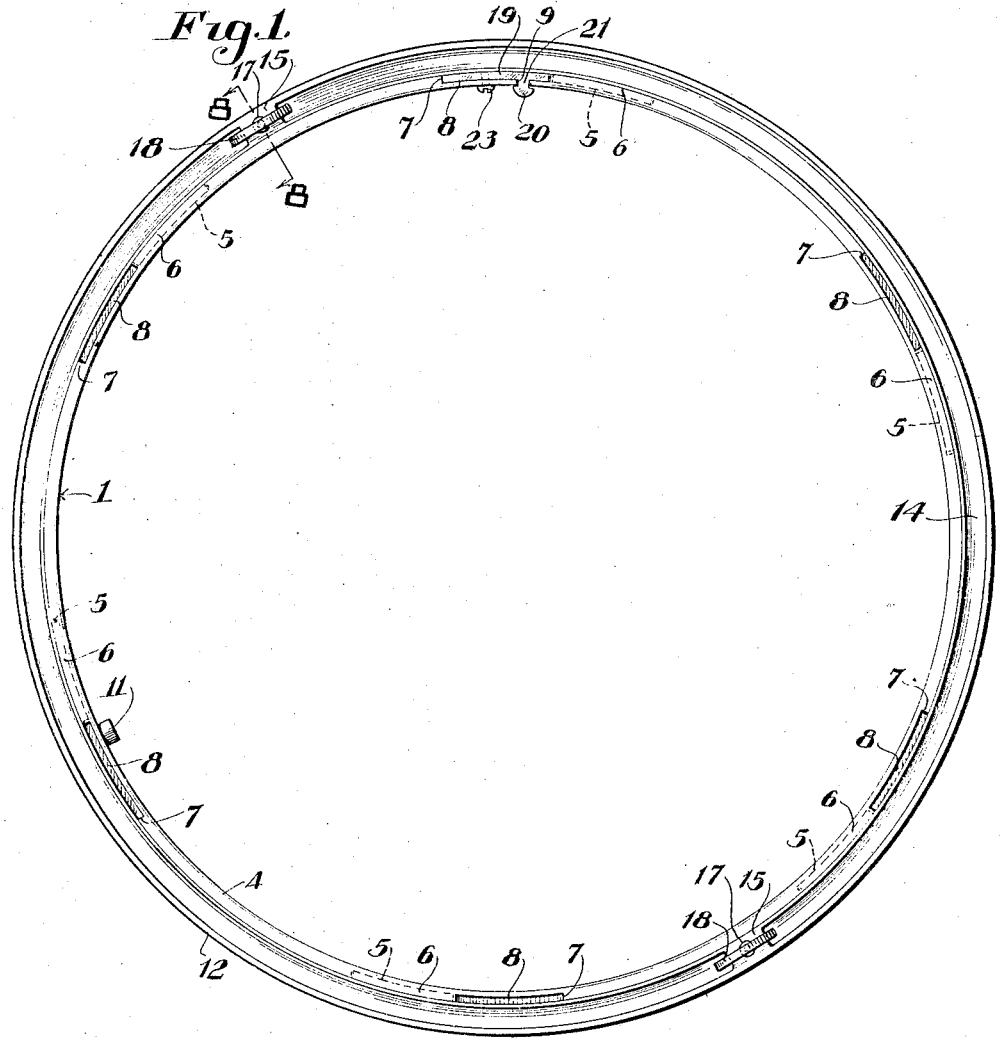
Figure 1 is a side elevation of a rim for demountable tires constructed in accordance with the present invention.
Figure 5:
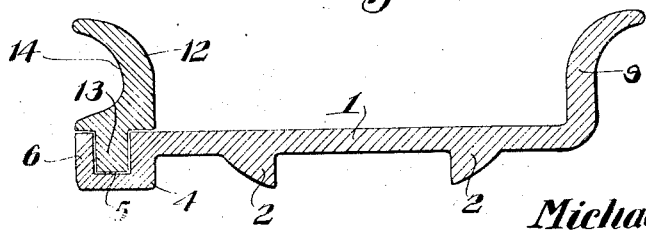
Figure 5 is a transverse sectional view taken on the line 5—5 of Figure 4.

The manipulation and operation of the ordinary, so-called demountable wheel rims to release a tire when punctured or damaged, usually entails so much work and hardship upon a motorist who endeavors to replace a tire, while out on the road or elsewhere where he cannot call upon expert help, that such damaged tires are often used for considerable mileage to the further detriment or complete demolition of the same, rather than attempt to change the tire. The present invention has been designed to overcome this difficulty by the provision of means which may be readily manipulated by a single person either to unlock the tire and remove the same from the wheel rim for repair, or for replacement by a new tire, and which may be as easily operated to again lock the tire in place.

To this end the invention consists in a continuous, metallic rim 1 having on its inner face circumferential ribs 2 defining a seat for the reception of an ordinary wheel felly, not shown, and while the drawing shows a rim adapted for use in connection with a wooden felly, it is to be understood that the same may be applied to any other kind of felly or wheel.

Along one edge of the rim 1, which edge constitutes the inner side of the wheel or rim, there is provided a continuous flange 3 extending entirely around the same and preferably formed by bending the metal of the rim in outward direction and shaped to fit the side of an ordinary pneumatic tire.

At the other or outer side of the rim, a continuous annular rib 4 is formed on the inner face thereof and flush with the edge of the rim, said rib serving to strengthen and stiffen this edge of the rim to conform to the strengthening effect of the flange 3 at the other side, and to provide for the formation of locking grooves, as will be explained.

A plurality of circumferential grooves 5 are formed in the outer face of the rim adjacent to the edge having the rib 4, said grooves having a depth substantially equal to the thickness of the rim, so that the rib 4 provides a bottom wall for the said grooves besides serving for strengthening purposes as before stated. The grooves, which may be of any desired number, equally spaced around the rim, are closed, for substantially one-half of their lengths, by a wall 6, which is a continuation of the side edge of the rim, and the space between the end of said fall 6 and the end wall 7 of the groove, defines an entrance opening 8 to the grooves for a purpose to be explained.

The bottom wall of one of the grooves 5 is provided with a recess 9 in its free edge at the entrance opening thereof, said recess being somewhat closer to the adjacent end of the wall 6 than to the end wall 7 of the groove, as clearly shown in Figures 3, 4 and 6 of the drawings. This same groove is also provided with an aperture 10 through the bottom wall thereof, at a point between the said recess 9 and the end wall 7 of the groove. In addition, the rim 1 is provided with the usual opening for the valve stem of a tire (not shown), and at a diametrically opposite point the said rim is provided with an inwardly directed lug 11, located midway between the sides of the rim, and adapted to fit in a suitable recess in the felly to prevent the rim from turning on said felly in a well known manner.

A locking ring or removable flange 12 formed of a continuous piece of suitable metal, is adapted to be fitted over the grooved side edge of the rim 1, said ring having an internal diameter to snugly fit the rim and having a cross-sectional shape to correspond generally to the shape of the rigid flange 3 so as to fit the tire in the same manner.

The ring 12 is provided with a series of inwardly-directed radial lugs 13, which are of a length and depth to substantially correspond with the dimensions of the aforesaid entrance openings 8, and of a thickness to snugly fit into the grooves 5 and to slide therein. The outer face of the ring 12 is further provided with a circumferential groove 14, extending entirely around the same to lighten the ring and to correspond with the exterior shape of the flange 3, and at diametrically-opposite points, the groove 14 is bridged by fillets 15, having threaded openings 16 into which may be screwed the threaded stems 17 of handles 18, which may be of any desired formation (see Figure 8).

A filler block 19 is adapted to be used in connection with the ring to hold the same in position in a manner to be explained, said filler block being arcuately formed and of a size and shape to freely enter the entrance opening 8, having the threaded aperture 10 associated therewith. The filler block is provided with a thumb-piece 20 formed at the outer edge thereof and closer to one end than the other, said thumb-piece having a reduced neck 21 adapted to fit into the aforesaid recess 9 with the outer face of the block and thumb-piece flush with the edge of the rim, and said thumb-piece extending within the rim to be easily engaged by the hand to remove the same when desired. The filler block is also provided with a threaded opening 22, for the reception of a screw 23, which also traverses the aforesaid aperture 10 to hold the block in place.

In applying a tire to the rim of the wheel, after the ring 12 has been removed, the tire is forced over said rim 1 in the usual manner until the inner bead of the tire abuts against the rigid flange 3 of the rim. Then the ring 12, preferably with the handles 18 attached thereto, is placed in position with the lugs 13 in alinement with the entrance openings 8, when the said locking ring 12 may be forced inwardly and over the edge of the rim, the lugs 13 passing through the openings 8 when, by grasping the said handles 18, the ring may be turned circumferentially to carry the lugs into the grooves 5 until the closed ends of the grooves are encountered by the lugs 13. At this time, the other ends of the lugs are substantially in alinement with the ends of the walls 6, and the filler block 19 is placed in the proper entrance opening, one end of said block being adapted to abut against the end of the lug 13 on the locking ring, and the other end of the block abutting against the end wall 7 of the groove so as to effectually prevent any retrograde movement of the ring with relation to the rim. By applying the screw 23 through the aperture 10 and turning the same into the threaded opening 22, the block is held rigidly in place, after which the said handles may be unscrewed from the threaded sockets 16 and placed in the tool kit, to be used again when needed for removing the locking ring.

From the foregoing it will be seen that a simple, cheaply manufactured and strong and durable means for holding the tire in position on a vehicle wheel has been provided, which may be easily operated by a motorist with little or no difficulty to remove the tire and to replace the same; that the same may be readily operated without the necessity for any special tools, and that, when properly placed in position to hold the tire and locked, the danger of becoming accidentally loosened or unlocked is reduced to a minimum.

What is claimed is:

1. A sectional wheel rim, comprising a continuous, rim member having a continuous tire-engaging flange around one edge, and provided near its other edge with a series of alined, spaced circumferential grooves in its outer face, said grooves extending partly through the rim member and being located adjacent to the said other edge of the rim member to define a relatively thin outer wall for each groove, said walls being each removed for substantially one-half their lengths to provide entrance openings at corresponding ends of the grooves, a tire locking ring adapted to be slipped over the free edge of the rim member to have a continuous circumferential bearing thereon and shaped in cross section to correspond with the opposite flange, inwardly directed and radially disposed lugs carried by said ring in spaced relation to each other, said lugs being passed through said entrance openings when the ring is applied to the rim member and adapted to fit in the grooves in abutting relation to the adjacent ends of the same when the ring is partially rotated, a removable block mounted in the open end of one of the grooves to bear against the adjacent end walls of the groove and lug respectively to prevent retrograde movement of said ring, and means for holding the block in position.

2. A sectional wheel rim, comprising a rim member having a tire-engaging flange around one circumferential edge, and spaced longitudinally alined, circumferential grooves formed in the outer face thereof adjacent to the other edge of the same, a continuous rib formed on the inner face of the rim member and beneath the grooves, the outer walls of the grooves having entrances, the bottom wall of one of the grooves having a notch or seat formed in its free edge adjacent to one end of the entrance, said wall also having a screw hole spaced from the notch, a tire retaining ring adapted to slide over the free edge of the rim member and shaped to match the said flange, said ring having lugs on its inner face to traverse the entrances when the ring is applied, and to occupy the closed ends of the grooves when the ring is turned, and a locking block corresponding in shape to and adapted to be seated in said entrance and groove to prevent retrograde movement of the ring, said block having an inwardly directed, radial thumb piece to fit flush in the notch or seat, and a screw hole to register with the hole in the rim member, and a screw threaded in the alined holes to hold the block in position.

In testimony, that I claim the foregoing as my own, I have hereto affixed my signature.

MICHAEL CAPORALE.